United States Patent [19]

Kuze et al.

[11] Patent Number: 5,243,018

[45] Date of Patent: Sep. 7, 1993

[54] BRANCHED HALOGENATED POLYCARBONATE HAVING TRIHALO PHENOXY END GROUPS

[75] Inventors: Shigeki Kuze; Takashi Komatsu, both of Ichihara, Japan

[73] Assignee: Idemitsu Petrochemical Co., Ltd., Tokyo, Japan

[21] Appl. No.: 924,066

[22] PCT Filed: Feb. 20, 1992

[86] PCT No.: PCT/JP92/00177

§ 371 Date: Sep. 11, 1992

§ 102(e) Date: Sep. 11, 1992

[87] PCT Pub. No.: WO92/14772

PCT Pub. Date: Sep. 3, 1992

[30] Foreign Application Priority Data

Feb. 22, 1991 [JP] Japan ................................ 48597

[51] Int. Cl.$^5$ .................................. C08G 64/14
[52] U.S. Cl. .......................... 528/198; 528/196; 528/202; 528/204
[58] Field of Search ............ 528/198, 196, 202, 204

[56] References Cited

U.S. PATENT DOCUMENTS

| | | | |
|---|---|---|---|
| 4,413,103 | 11/1983 | Katsuhisa et al. ............ | 525/469 |
| 4,831,100 | 5/1989 | Komatsu et al. ............. | 528/198 |
| 4,888,400 | 12/1989 | Boden et al. ................ | 525/462 |
| 5,185,425 | 2/1993 | Komatsu ..................... | 528/198 |

FOREIGN PATENT DOCUMENTS

| | | |
|---|---|---|
| 0061060 | 9/1982 | European Pat. Off. . |
| 0149190 | 7/1985 | European Pat. Off. . |
| 0296504 | 12/1988 | European Pat. Off. . |
| 0378858 | 7/1990 | European Pat. Off. . |
| 57-155233 | 9/1982 | Japan . |
| 59-22734 | 5/1984 | Japan . |
| 60-170662 | 9/1985 | Japan . |
| 64-79227 | 3/1989 | Japan . |
| 2-245023 | 9/1990 | Japan . |

*Primary Examiner*—Harold D. Anderson
*Attorney, Agent, or Firm*—Frishauf, Holtz, Goodman & Woodward

[57] ABSTRACT

This is a branched polycarbonate which comprises a branched structure derived from a branching agent such as 1,1,1-tris(4-hydroxyphenyl)ethane, a repeating unit (I) represented by the following general formula:

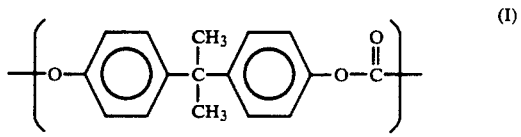

a repeating unit (II) represented by the following general formula:

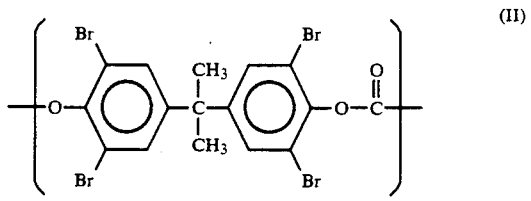

and a tribromophenoxy group bonded to the terminal thereof, said branched polycarbonate having a viscosity average molecular weight of 10,000 to 50,000, a ratio of said branched structure of 0.1 to 2.0 mol % and a content of said repeating unit (II) of 10 mol % or less.

This branched polycarbonate is excellent in flame retardancy, has sufficiently high mechanical properties and further is excellent in melt properties suitable for blow molding.

6 Claims, 2 Drawing Sheets

BRANCHED HALOGENATED POLYCARBONATE HAVING TRIHALO PHENOXY END GROUPS

TECHNICAL FIELD

The present invention relates to a novel branched polycarbonate and more specifically to a novel branched polycarbonate having excellent flame retardancy, mechanical strength and melt properties suitable for blow molding.

BACKGROUND ART

Conventionally, there have been known halogen-containing, flame retardant copolymerized polycarbonates disclosed in Japanese Patent Publication Nos. 40715/1971 and 24660/1972 and Japanese Patent Application Laid-Open Nos. 123294/1976, 136796/1976, 140597/1977, 50065/1979, 99226/1981 and the like. However, these polycarbonates have been found not to have satisfactory properties for an industrial use, with respect to flame retardancy, mechanical strength and melt properties suitable for blow molding.

It has been known that branched polycarbonates with the improved flame retardancy are provided according to a method in which alkali metal salts of inorganic mineral acid, organic carboxylic aid or sulfonic acid are added thereto (as disclosed in Japanese Patent Publication No. 51497/1985) and a method in which flame retardant monomers, for example tetrabromobisphenol A, are copolymerized therewith (as disclosed in Japanese Patent Publication No. 12132/1980). However, the mechanical strength achieved by the former method has not been sufficiently high because of the contamination associated with the additives, while that of the latter method has been improved due to a branching agent contained therein but still not good enough for use in the industrial production.

Thus, the present inventors have made extensive studies with a view to developing a novel polycarbonate which is excellent in flame retardancy, mechanical properties and melt properties suitable for blow molding.

DISCLOSURE OF INVENTION

As the result, it has been found that above problems can find a solution with a new polycarbonate in a branched shape, having a branched structure derived from a specific branching agent and further a trihalogenophenoxy group situated at the terminal thereof. The present invention has been completed based on this finding. Therefore, the present invention provides a branched polycarbonate which comprises a branched structure derived from a branching agent represented by the following general formula (A):

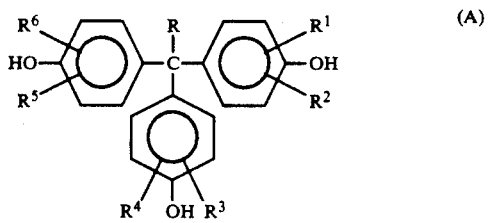

wherein R is a hydrogen atom or an alkyl group having 1 to 5 carbon atoms and $R^1$ to $R^6$ each are a hydrogen atom, an alkyl group having 1 to 5 carbon atoms or a halogen atom, a repeating unit (I) represented by the following general formula:

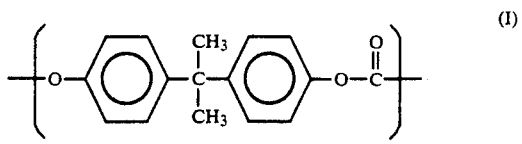

a repeating unit (II) represented by the following general formula:

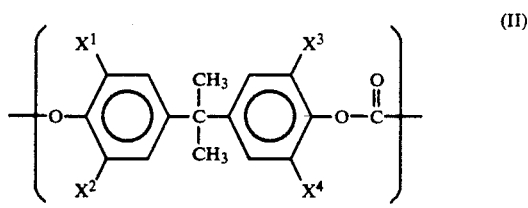

wherein $X^1$ to $X^4$ each are a halogen atom and a trihalogenophenoxy group represented by the following general formula (III):

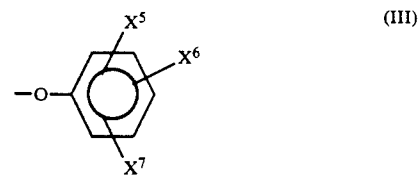

wherein $X^5$ to $X^7$ each are a halogen atom, as bonded to the terminal thereof, said branched polycarbonate having a viscosity average molecular weight of 10,000 to 50,000, a ratio of said branched structure of 0.1 to 2.0 mol % and a content of said repeating unit (II) of 10 mol % or less.

BEST MODE FOR CARRYING OUT THE INVENTION

Figure 1:
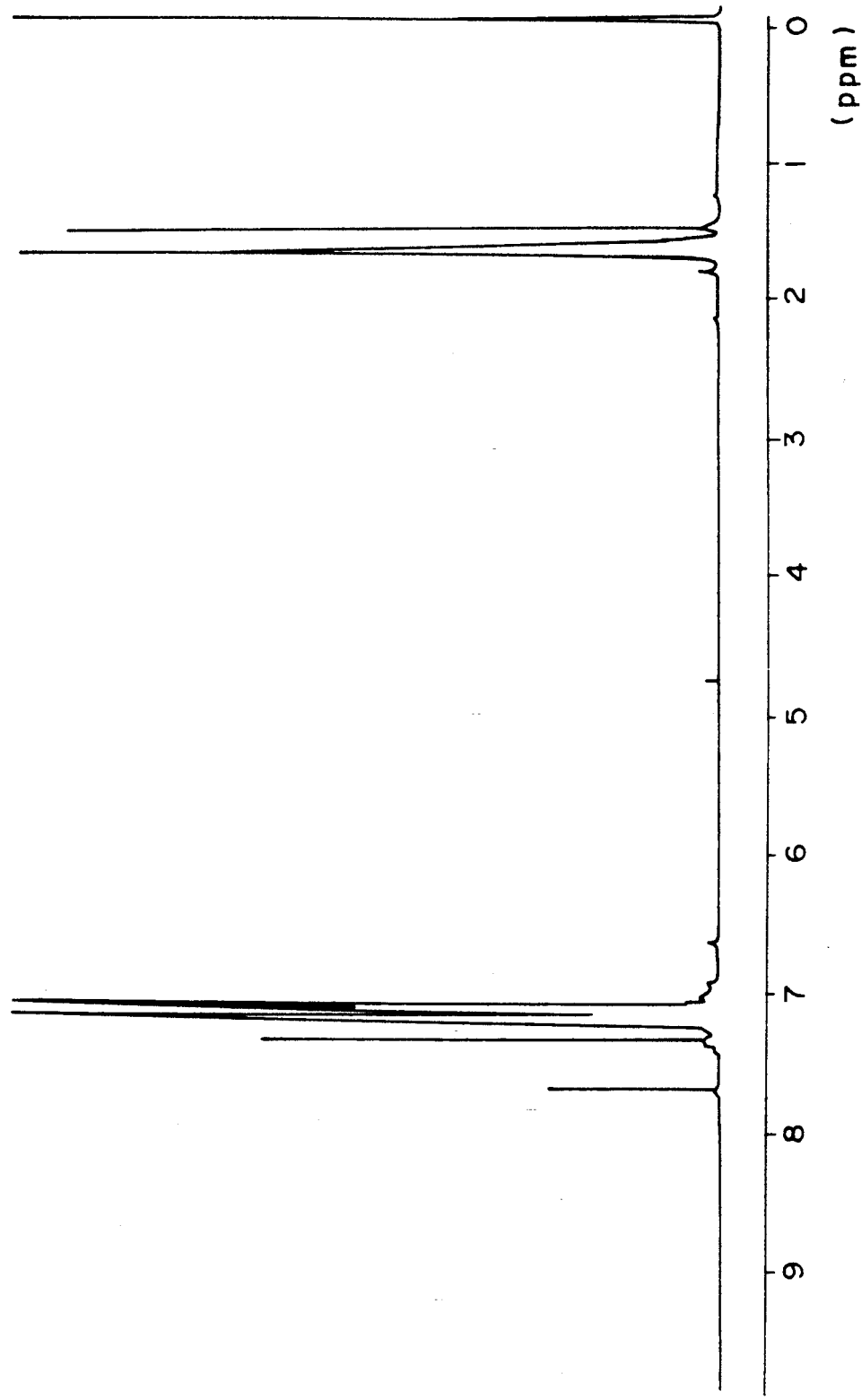
FIG. 1 is a chart showing a proton nuclear magnetic resonance ($^1$H-NMR) spectrum of the branched polycarbonate obtained in Example 1.

As stated above, a branched polycarbonate of the present invention comprises a branched structure derived from a branching agent represented by the following general formula (A):

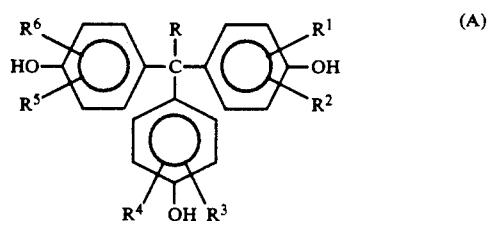

In this general formula, R is a hydrogen atom or an alkyl group having 1 to 5 carbon atoms, for example a methyl group, an ethyl group, a n-propyl group, a n-butyl group, a n-pentyl group and the like. $R^1$ to $R^6$ each are a hydrogen atom, an alkyl group having 1 to 5 carbon atoms (for example, methyl group, ethyl group, n-propyl group, n-butyl group, n-pentyl group and the like) or a halogen atom (for example, chlorine atom, bromine atom, fluorine atom and the like). Specific examples of the branching agent represented by the general formula (A) include 1,1,1-tris(4-hydroxyphenyl)methane; 1,1,1-tris(4-hydroxyphenyl)ethane; 1,1,1-tris(4-hydroxyphenyl)propane; 1,1,1-tris(2-methyl-4-hydroxyphenyl)methane; 1,1,1-tris(2-methyl-4-hydroxyphenyl)ethane; 1,1,1-tris(3-methyl-4-hydroxyphenyl)methane; 1,1,1-tris(3-methyl-4-hydroxyphenyl)ethane; 1,1,1-tris(3,5-dimethyl-4-hydroxyphenyl)methane; 1,1,1-tris(3,5-dimethyl-4-hydroxyphenyl)ethane; 1,1,1-tris(3-chloro-4-hydroxyphenyl)methane; 1,1,1-tris(3-chloro-4-hydroxyphenyl)ethane; 1,1,1-tris(3,5-dichloro-4-hydroxyphenyl)methane; 1,1,1-tris(3,5-dichloro-4-hydroxyphenyl)ethane; 1,1,1-tris(3-bromo-4-hydroxyphenyl)methane; 1,1,1-tris(3-bromo-4-hydroxyphenyl)ethane; 1,1,1-tris(3,5-dibromo-4-hydroxyphenyl)methane; 1,1,1-tris(3,5-dibromo-4-hydroxyphenyl)ethane and the like.

The branched polycarbonate of the present invention has the branched structure derived from said branching agents and specific examples thereof are those represented by the following general formula:

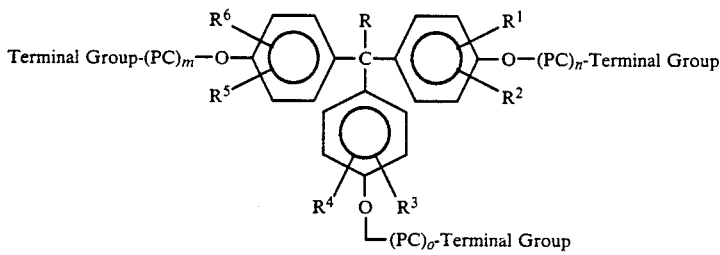

wherein m, n and o are integers, PC is a polycarbonate part and R and $R^1$ to $R^6$ are the same as described above.

The ratio of the branched structure (the ratio of the branched nucleus) is 0.1 to 2.0 mol %, preferably 0.2 to 1.0 mol % based on the whole polycarbonate. If the ratio is more than 2.0 mol %, the branched polycarbonate is liable to gelate and, if less than 0.1 mol %, it is poor in blow moldability.

The branched polycarbonate of the present invention comprises a repeating unit represented by the general formula (I) and a repeating unit represented by the general formula (II). With respect to the general formula (II), $X^1$ to $X^4$ each are a halogen atom such as bromine, chlorine and fluorine. These $X^1$ to $X^4$ may be the same or different but ordinarily they often are the same.

Furthermore, a trihalogenophenoxy group represented by the general formula (II) is bonded to the terminal, particularly to all terminals of the branched polycarbonate of the present invention. In the general formula (III), $X^5$ to $X^7$ each are a halogen atom such as bromine, chlorine and fluorine, as in the case of said $X^1$ to $X^4$.

Meanwhile, $X^1$ to $X^4$ of said repeating unit represented by the general formula (II) and $X^5$ to $X^7$ of the general formula (III) may be the same or different.

With respect to the molar fractions of the repeating units (I) and (II) in the branched polycarbonate of the present invention, it is important that said branched polycarbonate should have a content of the repeating unit (II) of 10 mol % or less, preferably 1 to 6 mol %. The branched polycarbonate is liable to have a low mechanical strength if it has the content of repeating unit (II) of more than 10 mol %.

Furthermore, with respect to the polymerization degree of the branched polycarbonate of the present invention, it is appropriate that said polycarbonate should have a viscosity average molecular weight in a range of 10,000 to 50,000, preferably 15,000 to 40,000. The branched polycarbonate cannot have a sufficiently high mechanical strength such as impact resistance if it has a viscosity average molecular weight of less than 10,000 and is poor in moldability if more than 50,000.

The branched polycarbonate of the present invention occurs as various forms of polymer such as random copolymer, block copolymer and alternating copolymer having a structure comprising said repeating units (I) and (II) and a trihalogenophenoxy group represented by the general formula (III) as bonded to terminal thereof.

Meanwhile, it does not matter even if a small amount of other repeating units than (I) and (II) is mixed into the molecular chain of this branched polycarbonate. Such other repeating units are made from a third comonomer, for example bisphenolsulfone (BPS), thiobisphenol (TDP) and the like. The content (molar fraction) of these other repeating units is preferably 0 to 20 mol %, more preferably 0 to 10 mol % based on the polycarbonate as the whole. If the content of these other repeating units is more than 20 mol %, the branched polycarbonate is liable to have a low mechanical strength undesirably.

The branched polycarbonate of the present invention can be manufactured according to various methods. Preferred examples of the manufacturing method include the following two.

In the first method of these two, the following materials are mixed and stirred in a predetermined amount and ratio: an alkaline aqueous solution of branching agent represented by the general formula (A); an alkaline aqueous solution (sodium hydroxide aqueous solution, potassium hydroxide aqueous solution, sodium carbonate aqueous solution and the like) of tetrahalogenobisphenol A (THA) (tetrabromobisphenol A, tetrachlorobisphenol A, tetrafluorobisphenol A and the like) which is the starting material of the repeating unit represented by the general formula (II); an alkaline aqueous solution of bisphenol A (BPA) which is the starting material of the repeating unit represented by the general formula (I) and an alkaline aqueous solution of trihalogenophenol (THP) (tribromophenol, trichlorophenol, trifluorophenol and the like) represented by the general formula (III); along with a solvent such as methylene chloride, chlorobenzene, pyridine, chloroform and carbon tetrachloride and a catalyst such as tertiary amine (triethylamine, trimethylamine and the like) or quaternary ammonium salt (trimethylbenzylammonium chloride and the like). Phosgene is then blown into the mixture to form a polycarbonate oligomer. The reaction temperature is not particularly limited but ordinarily in a range of 0° to 50° C., preferably 5° to 40° C. The operating time is properly chosen in a range of 10 minutes to 3 hours. The reaction system is exothermic, preferably cooled with water or ice. Meanwhile, monohydric phenol such as p-tert-butylphenol or phenol can be used in combination herein by replacing a part (50 mol % or less) of trihalogenophenol.

Next, BPA, said solvent, said alkaline aqueous solution and catalyst are added to the obtained polycarbonate oligomer solution, they are stirred and the reaction is continued to perform the interfacial polycondensation. A phase containing the reaction product is washed and subjected to the purifying treatment to obtain the desired branched polycarbonate. The reaction temperature is not particularly limited but ordinarily in a range of 0° to 50° C., preferably 5° to 40° C. The operating time is properly chosen in a range of 10 minutes to 6 hours.

According to the second manufacturing method, BPA, said solvent and said alkaline aqueous solution are mixed and stirred and phosgene is blown into the mixture to form a polycarbonate oligomer. The reaction temperature is not particularly limited but ordinarily in a range of 0° to 50° C., preferably 5° to 40° C. The operating time is in a range of 10 minutes to 3 hours. The reaction system is exothermic, preferably cooled with water or ice.

Next, said branching agent, said THA and THP and said alkaline aqueous solution and catalyst are added to the so obtained polycarbonate oligomer solution, they are stirred and the reaction is continued to perform the interfacial polycondensation (pre-condensation) (the reaction temperature ordinarily is in a range of 0° to 50° C., preferably 5° to 40° C. and the operating time is properly chosen in a range of 10 minutes to 3 hours). After the reaction, BPA, said alkaline aqueous solution and solvent are incorporated into the reaction system and they are reacted again. This step requires different reaction temperatures depending circumstances, but ordinarily the reaction temperature is in a range of 0° to 50° C., preferably 5° to 40° C. and the operating time is chosen in a range of 10 minutes to 6 hours. A phase containing the reaction product is washed and subjected to the purifying treatment to obtain the desired branched polycarbonate.

Furthermore, the branched polycarbonate of the present invention can be obtained according to the following methods, other than above-mentioned two processes. For example, there is a method wherein BPA, a branching agent and phosgene are reacted, followed by the reaction with THA and THP and then the reaction with BPA or a method wherein one oligomer is made of BPA and phosgene, another is made of THA and phosgene and then a branching agent and BPA are reacted with the so-obtained oligomers, and such like. The question when the catalyst should be added during the process for producing the branched polycarbonate is not subjected to any particular limitation, but it is preferable to add the catalyst when THA, THP and the branching agent are reacted.

During above-mentioned interfacial polycondensation reaction, the repeating unit (II) is made from THA and the repeating unit (I) from BPA within the oligomer to be obtained. Therefore, the charge of THA and that of BPA are properly proportioned according to the molar fractions of the repeating units (I) and (II) of the forthcoming branched polycarbonate or according to the ratio of halogen atoms that branched polycarbonate has to contain. The inputs of THP and phosgene are the decisive factor in determining the polymerization degree respectively of repeating units (I) and (II) and further the polymerization degree and molecular weight of the branched polycarbonate as a whole. Thus, their inputs capable of achieving the object are chosen. Phosgene is blown into the reaction system by regulating the blow amount per hour properly in the way that the total of required phosgene is supplied by the time the reaction is brought to the end.

With respect to above-mentioned reaction, phosgene can be replaced by various carbonic ester-forming derivatives, for example bromophosgene, bis(2,4,6-trichlorophenyl)carbonate, bis(2,4-dichlorophenyl)carbonate, bis(2-cyanophenyl)carbonate, trichloromethyl chloroformate and the like.

The branched polycarbonate of the present invention can be obtained according to any of these manufacturing methods.

As stated above, it is appropriate that the branched polycarbonate of the present invention should have the viscosity average molecular weight in a range of 10,000 to 50,000, preferably 15,000 to 40,000. The viscosity average molecular weight can be adjusted to this range chiefly by choosing a right amount of THP used as a molecular weight modifier. Ordinarily, THP is used preferably at a ratio of 0.01 to 0.1-fold mole based on dihydric phenols from which the polymer is made.

Furthermore, BPA, the alkaline aqueous solutions and the catalyst such as triethylamine are added to the polycarbonate oligomer to conduct the interfacial polycondensation and form the polycarbonate. The catalyst is used preferably in an amount calculated by a rate of catalyst/chloroformate (or bromoformate and the like) group giving 0.0005 to 0.03 (mole/mole).

In the same case where BPA, the alkaline aqueous solutions and the catalyst such as triethylamine are added to the polycarbonate oligomer to conduct the interfacial polycondensation and form the polycarbonate, a caustic alkali required therefor is used preferably in an amount calculated by a rate of caustic alkali/hydroxyl group of phenols giving 0.5 to 5.0 (mole/mole).

Apart from the interfacial polycondensation, the branched polycarbonate of the present invention can also be obtained by the molten polycondensation and solid phase polymerization methods using carbonic ester-forming derivatives such as diphenyl carbonate, bis(2,4,6-trichlorophenyl)carbonate, dimethyl carbonate, diethyl carbonate and dibutyl carbonate. For the branched polycarbonate of the present invention, various additives can be used in response to needs, including halogen-containing flame retardants, other flame retardants such as alkaline (earth) metal salt of organic sulfonic acid, mold release agents, lubricants, antioxidants, ultraviolet absorbers, pigments and the like. Likewise, other thermoplastic resins, glass fibers, inorganic fillers and the like can be mixed with this branched polycarbonate according to uses.

Now, the present invention will be described in greater detail with reference to the examples and the comparative examples.

SYNTHETIC EXAMPLE

Synthesizing a Polycarbonate Oligomer 2730 g of BPA, 10 liters of methylene chloride and 16.8 liters of a 2.0N sodium hydroxide aqueous solution were placed in a container having internal volume of 60 liters with a stirrer, stirred and cooled on a water bath, while phosgene is blown into them for 70 minutes. The so-obtained reaction solution was allowed to stand at room temperature and a methylene chloride solution of oligomer was isolated and formed in a lower phase. The oligomer was found to have a concentration of 320 g/liter, a number average molecular weight of 850 and a concentration of chloroformate groups of 0.7 mol/liter.

EXAMPLE 1

10 liters of the polycarbonate oligomer solution synthesized in said synthetic example, 196 g (0.36 mole) of tetrabromobisphenol A (TBA), 169 g (0.51 mole) of tribromophenol (TBP), 21.8 g (0.071 mole) of 1,1,1-tris(4-hydroxyphenyl)ethane (THPE), 86.6 g (2.17 mole) of sodium hydroxide, 2.9 ml (0.021 mole) of triethylamine and 1.35 liters of water were placed in a container having internal volume of 50 liters with a stirrer and stirred for 60 minutes to react (pre-condensation)

After the reaction was over, 457 g (2.00 mol) of BPA, 267 g (6.68 mole) of sodium hydroxide, 3.42 liters of water and 6.1 liters of methylene chloride were added to said reaction system and they were stirred to react.

Sixty minutes later, the obtained reaction product was separated into a water phase and a methylene chloride phase containing a copolymer formed therein.

The methylene chloride phase was washed with an alkali (0.01N sodium hydroxide aqueous solution), an acid (0.1N hydrochloric acid) and water in the named order. Methylene chloride was removed from the methylene chloride phase at 40° C. under reduced pressure to obtain a white powdery copolymer. The copolymer was dried at 120° C. and subjected to the pelletization.

The so-obtained copolymer (the branched polycarbonate) was found to have a viscosity average molecular weight of 24,100 and a glass-transition temperature at 156° C. The molecular weight distribution was determined by the gel permeation chromatography, resulting in a finding that a single peak was assigned to the distribution.

This copolymer was subjected to NMR to determine the content of each comonomer, resulting in a finding of BPA: 93.6 mol %, TBA: 2.3 mol %, TBP: 3.6 mol % and THPE: 0.5 mol %.

Figure 2:
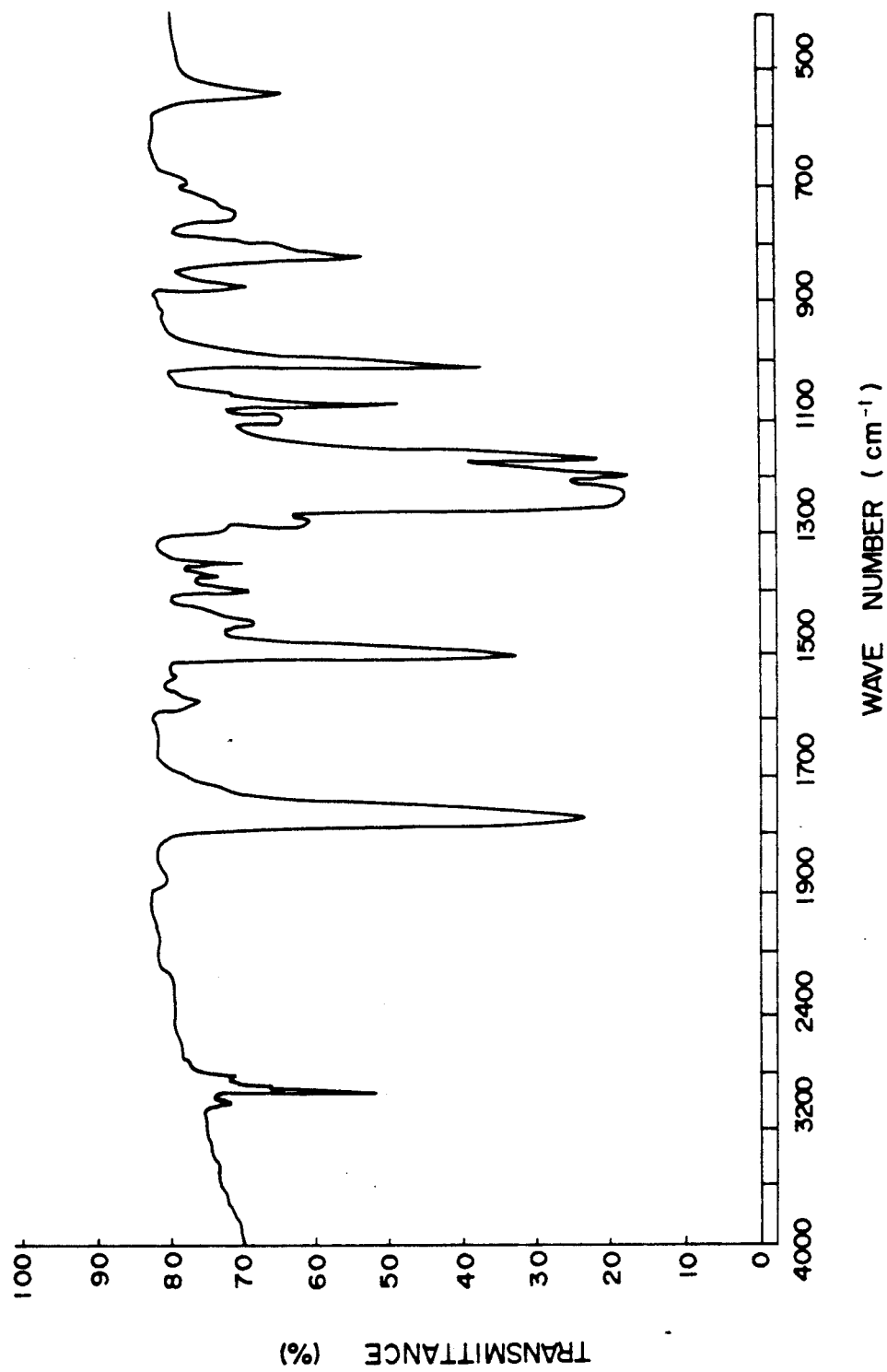
FIG. 2 is a chart showing an infrared absorption (IR) spectrum of the branched polycarbonate obtained in Example 1.

The bromine content of the so-obtained pellet was determined, with the resulting finding of 6.1% by weight. The determination of the bromine content was conducted by decomposing a test sample with an alkali and analyzing the so-decomposed sample according to the Volhard method. The properties of the so obtained branched polycarbonate are shown in Tables 1 and 2. FIG. 1 shows $^1$H—NMR spectrum and FIG. 2 shows IR spectrum.

EXAMPLES 2 TO 6 AND COMPARATIVE EXAMPLES 1 TO 3

These examples and comparative examples were carried out in accordance with substantially the same procedure as in Example 1, except that different monomers and different amounts of sodium hydroxide were used for the pre-condensation. The properties of the so obtained branched polycarbonates are shown in Tables 1 and 2. A p-t-butylphenol was used as PTBP in the Comparative Examples.

TABLE 1

| | Weight of Starting Monomer (g) | | | | | | Used NaOH (g) |
|---|---|---|---|---|---|---|---|
| | TBA | BPS | TDP | THPE | TBP | PTBP | |
| Example 1 | 196 | 0 | 0 | 21.8 | 169 | 0 | 86.6 |
| Example 2 | 341 | 0 | 0 | 21.8 | 169 | 0 | 118.6 |
| Example 3 | 196 | 75 | 0 | 21.8 | 169 | 0 | 122.7 |
| Example 4 | 196 | 0 | 162 | 21.8 | 169 | 0 | 185.0 |
| Example 5 | 153 | 0 | 0 | 21.8 | 169 | 0 | 77.2 |
| Example 6 | 196 | 0 | 0 | 32.7 | 169 | 0 | 93.1 |
| Comparative Example 1 | 196 | 0 | 0 | 0 | 169 | 0 | 73.9 |
| Comparative Example 2 | 196 | 0 | 0 | 21.8 | 0 | 76.6 | 86.6 |
| Comparative Example 3 | 426 | 0 | 0 | 21.8 | 0 | 76.6 | 137.4 |

TABLE 2

| | Copolymerization Composition (mol %) | | | | | | |
|---|---|---|---|---|---|---|---|
| | BPA | TBA | BPS | TDP | THPE | TBP | PTBP |
| Example 1 | 93.6 | 2.3 | 0 | 0 | 0.50 | 3.6 | 0 |
| Example 2 | 91.9 | 4.0 | 0 | 0 | 0.51 | 3.6 | 0 |
| Example 3 | 91.6 | 2.2 | 2.1 | 0 | 0.48 | 3.6 | 0 |
| Example 4 | 88.2 | 2.4 | 0 | 5.2 | 0.47 | 3.7 | 0 |
| Example 5 | 94.1 | 1.8 | 0 | 0 | 0.50 | 3.6 | 0 |
| Example 6 | 93.5 | 2.3 | 0 | 0 | 0.74 | 3.5 | 0 |
| Comparative Example 1 | 94.2 | 2.3 | 0 | 0 | 0 | 3.5 | 0 |
| Comparative Example 2 | 93.8 | 2.1 | 0 | 0 | 0.52 | 0 | 3.6 |
| Comparative Example 3 | 90.7 | 5.2 | 0 | 0 | 0.50 | 0 | 3.6 |

| | Bromine Content (% by weight)*1 | Mv*2 | Izod Impact Strength*3 (kg · cm/cm) |
|---|---|---|---|
| Example 1 | 6.1 | 23900 | 94 |
| Example 2 | 7.9 | 23700 | 82 |
| Example 3 | 6.0 | 24000 | 74 |
| Example 4 | 6.1 | 23700 | 77 |
| Example 5 | 5.5 | 24100 | 95 |
| Example 6 | 6.2 | 26500 | 90 |
| Comparative Example 1 | 6.0 | 20800 | 92 |
| Comparative Example 2 | 2.6 | 23900 | 90 |
| Comparative Example 3 | 6.2 | 23700 | 25 |

| | Flame Retardancy*4 (1/16 inch) | Non-Newtonian Parameter*5 |
|---|---|---|
| Example 1 | V-0 | 61 |
| Example 2 | V-0 | 58 |
| Example 3 | V-0 | 55 |
| Example 4 | V-0 | 58 |
| Example 5 | V-0 | 62 |
| Example 6 | V-0 | 69 |
| Comparative Example 1 | V-0 | 26 |
| Comparative Example 2 | V-2 | 55 |
| Comparative | V-0 | 57 |

TABLE 2-continued

Example 3

[1] The copolymers decomposed with an alkali were analyzed according to the Volhard method.

[2] The viscosity of methylene chloride was determined at 20° C. by an Ubbelohde viscometer and then the viscosity average molecular weight was converted from the result thereof.

[3] By using a test piece ⅛ inch thick and according to JIS-K-7110.

[4] A vertical flame test was conducted by using a Flame Retardancy Test UL-94 1/16 inch (thickness) according to Underwriter Laboratories Subject 94.

[5] A non-Newtonian parameter was used to express blow moldability in terms of the value of physical properties. The non-Newtonian parameter means a ratio ($D_2/D_1$) between the shearing rate at one shearing stress of $9 \times 10^5$ dyn/cm$^2$ ($D_1$) and the shearing rate at another of $8 \times 10^6$ dyn/cm$^2$ ($D_2$), under the condition of a temperature of 280° C. and an orifice of L/D = 20/1. The non-Newtonian parameter is preferably 30 to 90, more preferably 40 to 80. When the parameter is less than 30, the branched polycarbonate is susceptible to greater drawdown and thus is poor in blow moldability. When it is more than 90, the branched polycarbonate has too high melt viscosity to be suitable for molding.

INDUSTRIAL APPLICABILITY

As stated above, the branched polycarbonate of the present invention possesses certain high valuable properties, particularly with respect to flame retardancy, impact resistance and further melt properties suitable for blow molding. Specifically, its flame retardancy was determined by using a UL-94 1/16 inch (thickness), resulting in a finding of V-0. Furthermore, it was found that impact resistance was 50 kg.cm/cm in terms of the Izod impact strength and that the melt properties suitable for blow molding were more than 30 in terms of the non-Newtonian parameter.

Therefore, the branched polycarbonate of the present invention can find effective application in a wide variety of industrial materials, for example household appliances, business automation equipment, building materials, sheets and the like.

We claim:

1. A branched polycarbonate which comprises a branched structure derived from a branching agent represented by the following general formula (A):

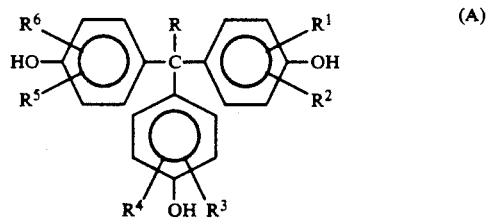

wherein R is a hydrogen atom or an alkyl group having 1 to 5 carbon atoms and $R^1$ to $R^6$ each are a hydrogen atom, an alkyl group having 1 to 5 carbon atoms or a halogen atom, a repeating unit (I) represented by the following general formula:

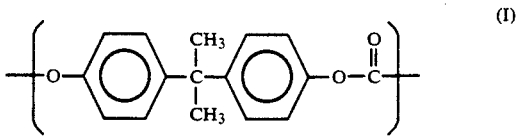

a repeating unit (II) represented by the following general formula:

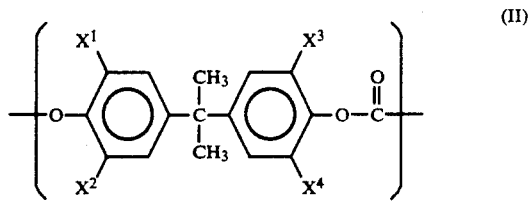

wherein $X^1$ to $X^4$ each are a halogen atom and a trihalogenophenoxy group represented by the following general formula (III):

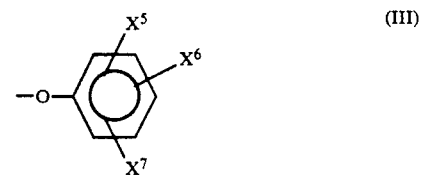

wherein $X^5$ to $X^7$ each is a halogen atom bonded to the terminal thereof, said branched polycarbonate having a viscosity average molecular weight of 10,000 to 50,000, a ratio of said branched structure of 0.1 to 2.0 mol % and a content of said repeating unit (II) of 10 mol % or less.

2. A branched polycarbonate according to claim 1, wherein the branching agent is 1,1,1-tris(4-hydroxyphenyl)methane; 1,1,1-tris(4-hydroxyphenyl)ethane; 1,1,1-tris(4-hydroxyphenyl)propane; 1,1,1-tris(2-methyl-4-hydroxyphenyl)methane; 1,1,1-tris(2-methyl-4-hydroxyphenyl)ethane; 1,1,1-tris(3-methyl-4-hydroxyphenyl)methane; 1,1,1-tris(3-methyl-4-hydroxyphenyl)ethane; 1,1,1-tris(3,5-dimethyl-4-hydroxyphenyl)methane; 1,1,1-tris(3,5-dimethyl-4-hydroxyphenyl)ethane; 1,1,1-tris(3-chloro-4-hydroxyphenyl)methane; 1,1,1-tris(3-chloro-4-hydroxyphenyl)ethane; 1,1,1-tris(3,5-dichloro-4-hydroxyphenyl)methane, 1,1,1-tris(3,5-dichloro-4-hydroxyphenyl)ethane; 1,1,1-tris(3-bromo-4-hydroxyphenyl)methane; 1,1,1-tris(3-bromo-4-hydroxyphenyl)ethane: 1,1,1-tris(3,5-dibromo-4-hydroxyphenyl)methane or 1,1,1-tris(3,5-dibromo-4-hydroxyphenyl)ethane.

3. A branched polycarbonate according to claim 1, having a content of said repeating unit (II) of 1 to 6 mol %.

4. A branched polycarbonate according to claim 1, wherein $X^1$ to $X^7$ each is a bromine atom.

5. A branched polycarbonate according to claim 1, having a ratio of said branched structure of 0.2 to 1.0 mol %.

6. A branched polycarbonate according to claim 1, having a viscosity average molecular weight of 15,000 to 40,000.

* * * * *